GEORGE B. STONE, OF CHICAGO, ILLINOIS.

Letters Patent No. 87,599, dated March 9, 1869.

IMPROVEMENT IN THE MANUFACTURE OF SPIRITS.

The Schedule referred to in these Letters Patent and making part of the same.

*To all whom it may concern:*

Be it known that I, GEORGE B. STONE, of Chicago, in the county of Cook, and State of Illinois, have invented a new and useful Improved Compound to be used in the Manufacture of Spirits; and I do hereby declare the following to be a full, clear, and exact description of the same.

The nature of my invention consists in the use of glycerine in the manufacture of spirits; and It also consists in the use of barley-sugar and glycerine, substantially as hereinafter described.

By the use of glycerine, as hereinafter described, in the manufacture of spirits by rectification, the chemical change that is attributable to age is promoted, and an equally good article is produced in a short space of time; and also, in addition to giving to the spirit a fictitious age, it gives it a peculiar blandness, and flavor, and nutrition, which ordinary spirits do not possess.

When used in the process of redistillation, it increases the specific gravity of the wines, and thus retards the vaporization of the fusel-oil at the ordinary temperature of manufacturing alcohol. It therefore produces a purer spirit, more free of fusel-oil than when manufactured by the ordinary process.

I use barley-sugar in the preparation of the glycerine, to prevent the destructive distillation or decomposition thereof when submitted to a high degree of temperature; and the barley-sugar also communicates to the spirit a peculiar delicacy of flavor, which is not otherwise obtained.

To enable those skilled in the art to understand how to manufacture and use my invention, I will proceed to describe it with particularity.

When I use barley-sugar, I first raise the glycerine, in any suitable vessel, to a high degree of heat, say about 212°, sufficiently high to dissolve the sugar. I then add thereto the sugar by degrees, stirring the mixture meanwhile, and continuing the heat till I have dissolved in the glycerine about one pound of sugar to each gallon of glycerine. I usually then suddenly increase the temperature of the mixture to about 220°, when I remove the fire, and thoroughly cool the mixture. When it is cool, I draw it off, so as to leave the sediment, if there should be any. There is no sediment if the mixture or compound is skilfully prepared.

I do not limit myself to the use of the above mixture or compound, for glycerine alone will produce nearly as good a result.

Whether I use the glycerine alone, or the compound above described, it is applied or used in the same way, and it is simply introduced, during the process of manufacture of the spirit, in any known way of introducing any other ingredient.

I do not limit myself to any proportionate quantity, either when I use the glycerine alone, or when I use the mixture, as the quantity used only affects the results in degree.

Having thus described the nature and use of my invention,

What I claim, and desire to secure by Letters Patent, is—

1. The use of glycerine in the manufacture of spirits, substantially as and for the purposes specified.

2. The use of barley-sugar and glycerine in the manufacture of spirits, when prepared substantially as described.

GEORGE B. STONE.

Witnesses:
LEWIS L. COBURN,
J. L. COBURN.